Figure 1:
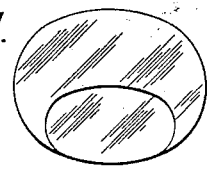

H. NEWBOLD.
APPARATUS FOR MAKING BIFOCAL LENSES.
APPLICATION FILED FEB. 26, 1913.

1,158,002.

Patented Oct. 26, 1915.
7 SHEETS—SHEET 1.

Witnesses.
J. K. Moore
Robt E. Barry

Inventor.
H. Newbold

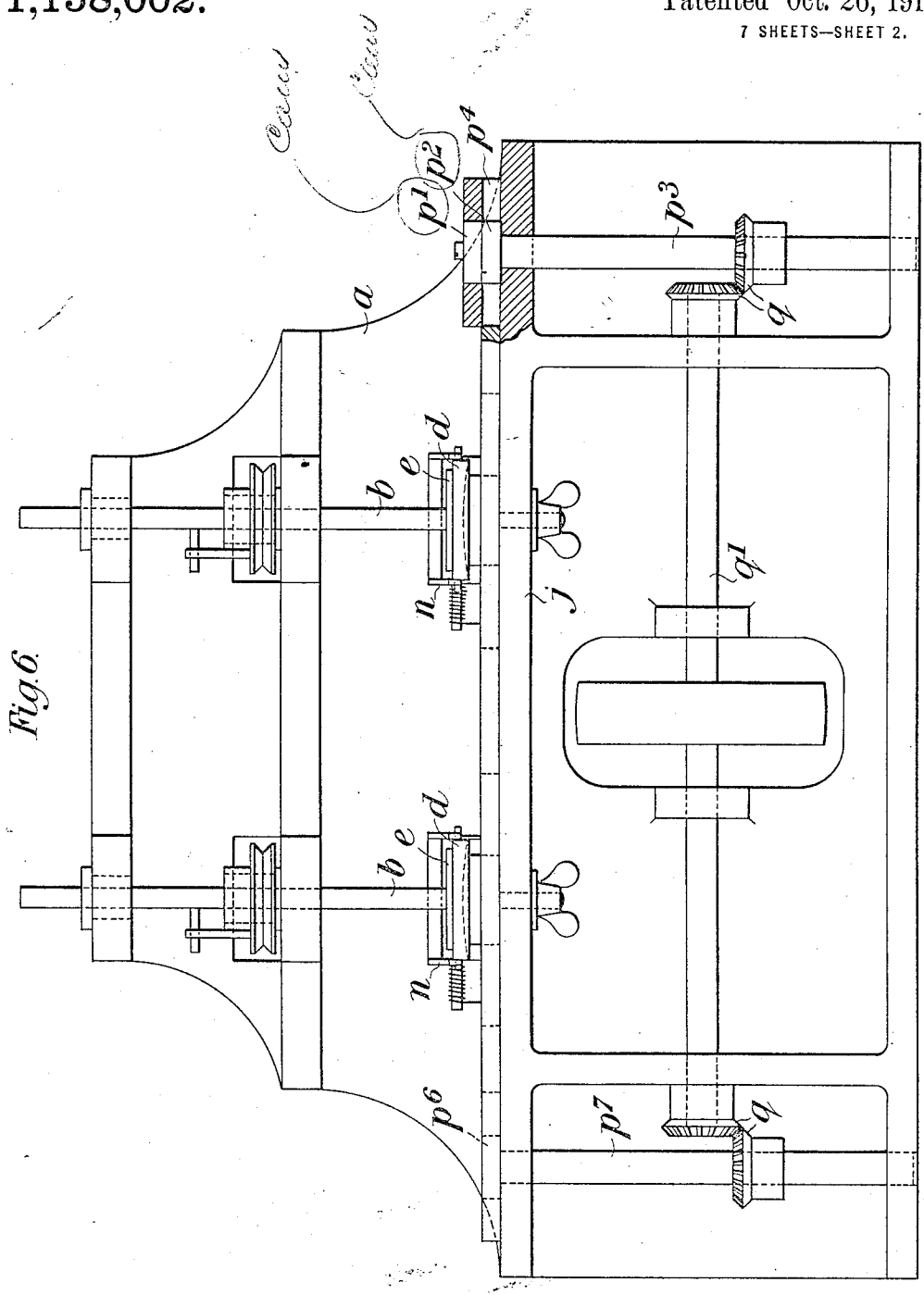

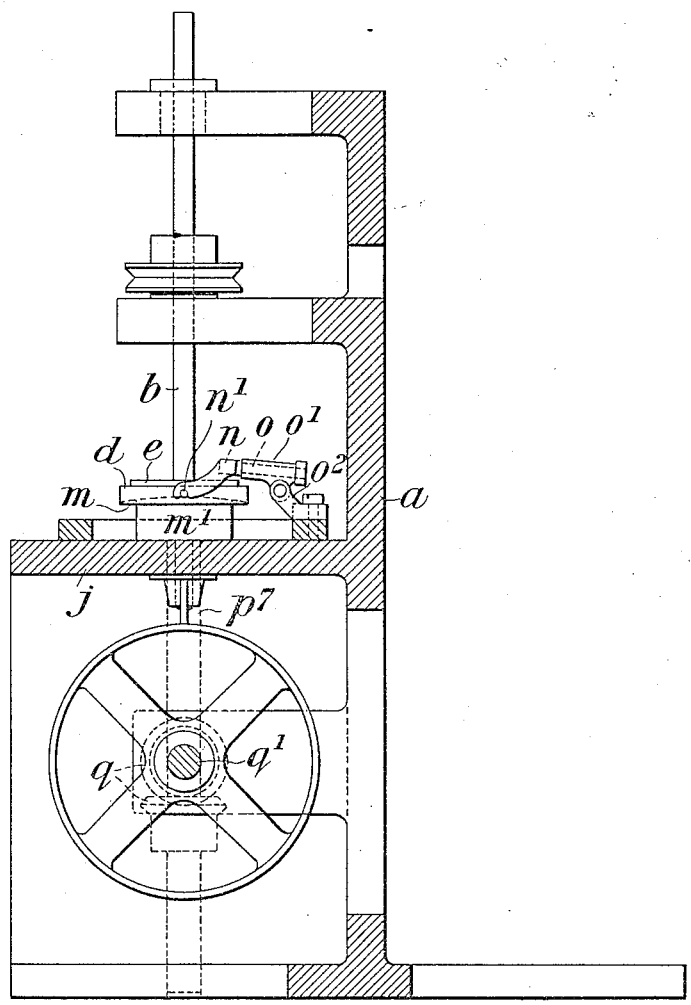

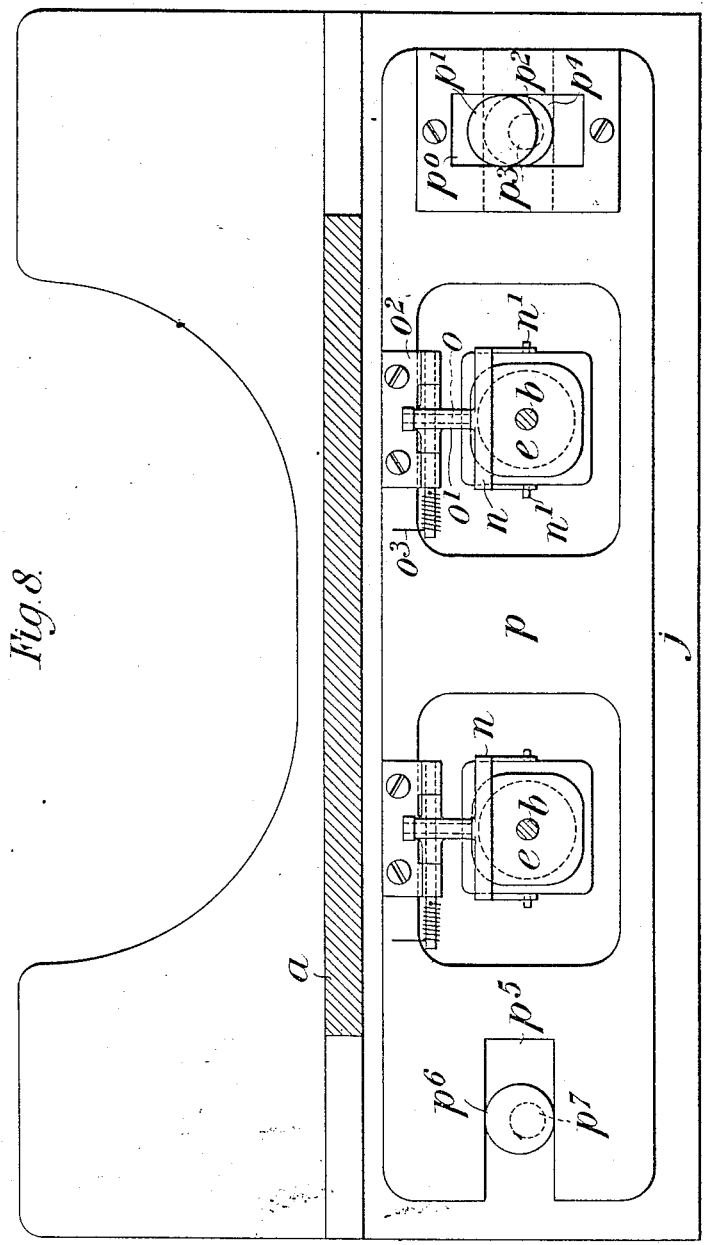

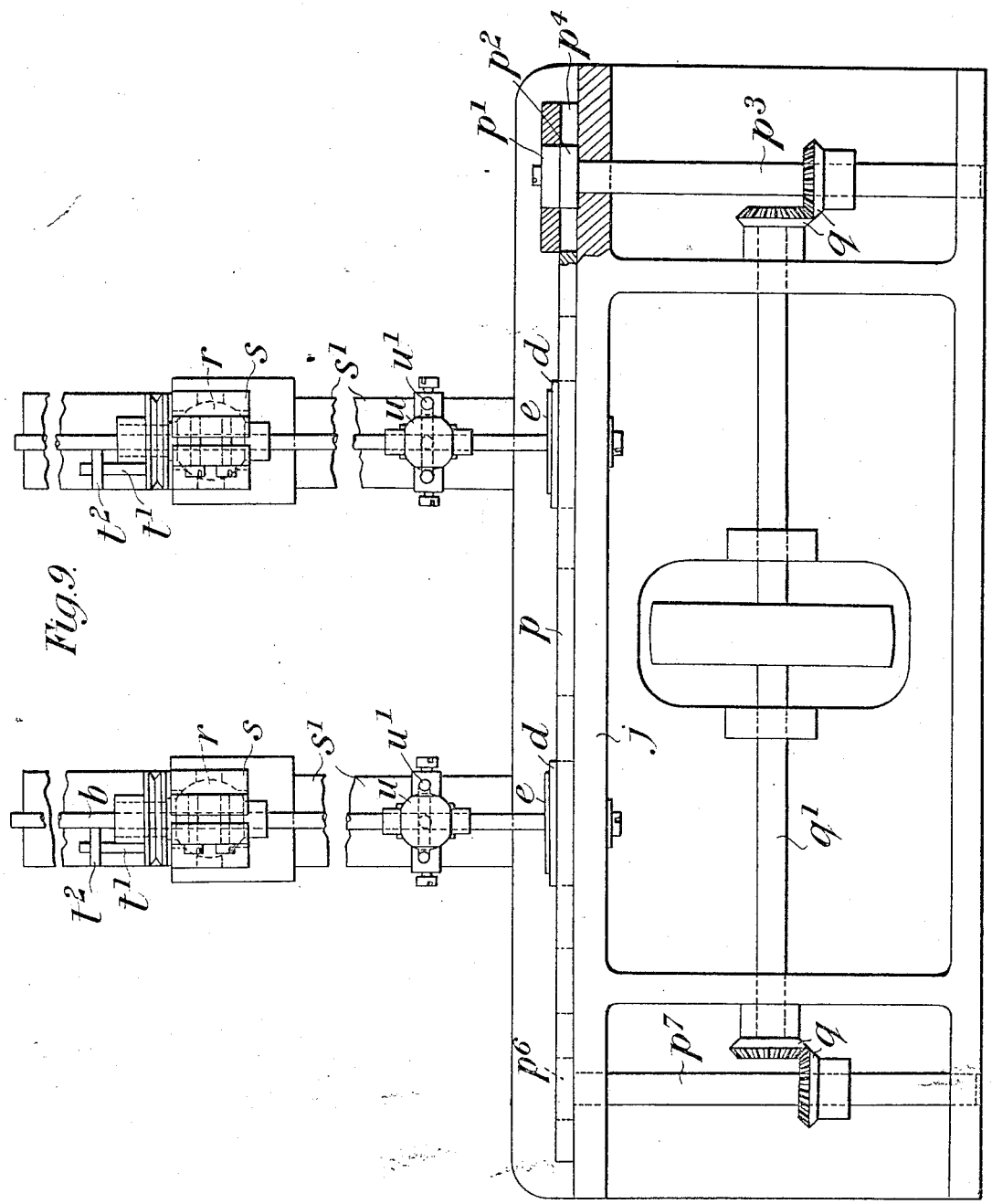

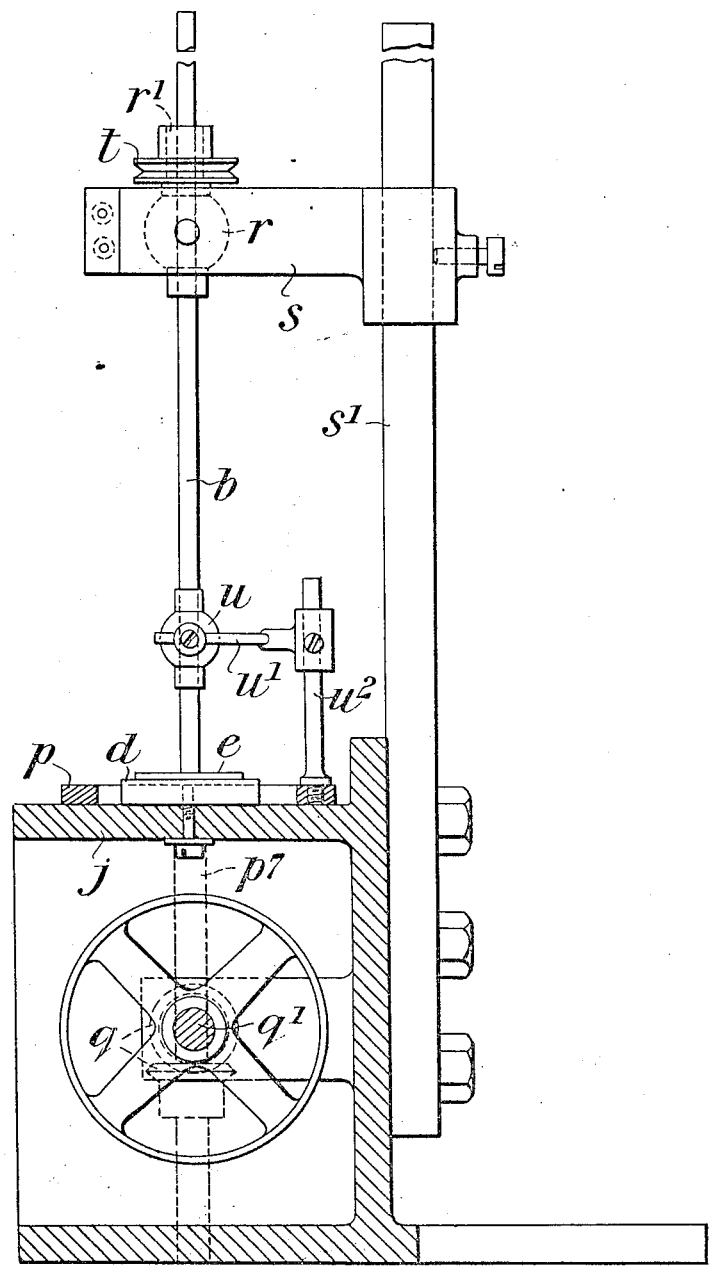

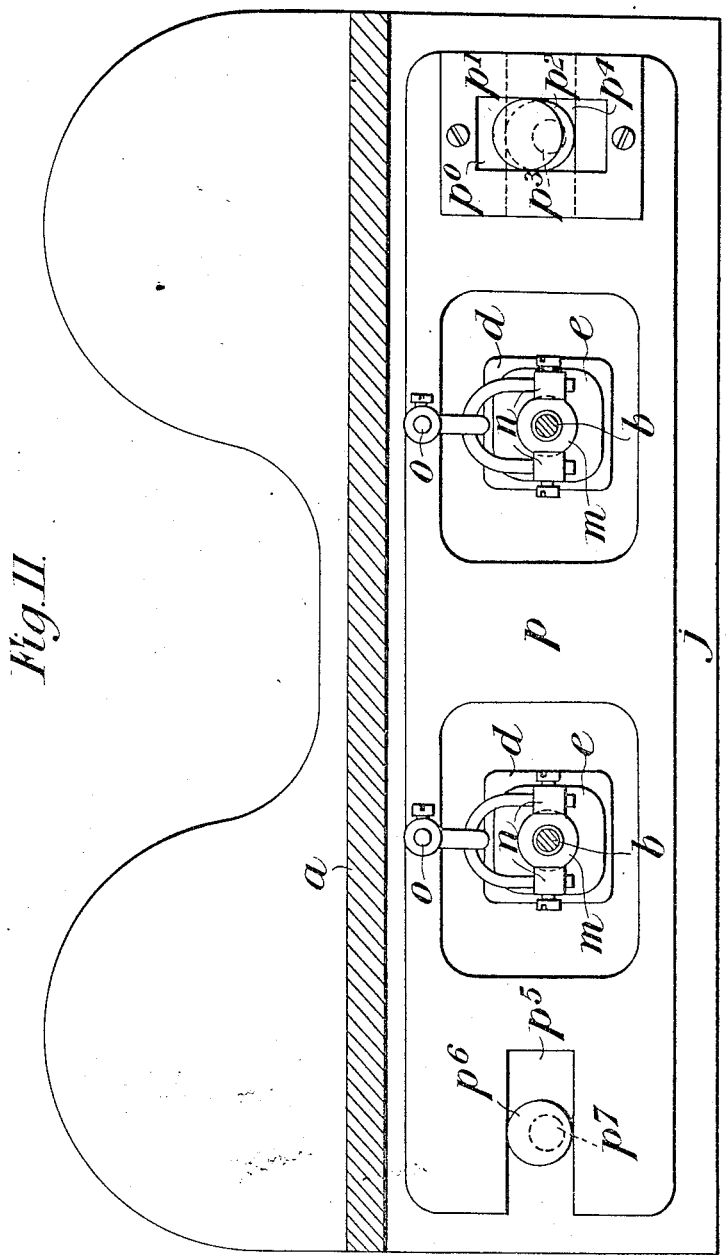

UNITED STATES PATENT OFFICE.

HARRY NEWBOLD, OF ST. ALBANS, ENGLAND, ASSIGNOR OF ONE-HALF TO WARNER REED WILLIAMS, OF LONDON, ENGLAND.

APPARATUS FOR MAKING BIFOCAL LENSES.

1,158,002.     Specification of Letters Patent.     Patented Oct. 26, 1915.

Application filed February 26, 1913. Serial No. 750,841.

*To all whom it may concern:*

Be it known that I, HARRY NEWBOLD, a subject of the King of Great Britain, residing at "Holywell," Holywell Hill, St. Albans, Hertfordshire, England, have invented new and useful Improvements in Apparatus for Making Bifocal Lenses, of which the following is a specification.

This invention relates to bi-focal lenses and to apparatus for the manufacture of the same.

As is well known bi-focal lenses as used for eye-glasses and spectacles have been formed from a solid piece of glass, the dividing line between the two curves or foci being circular or semicircular which gives rise to certain limitations in practice, since the field of the lower focus must be somewhat restricted, or the dividing line must be brought into too close proximity to the center of the lens.

Now, my invention has for its object to provide a machine for grinding bi-focal lenses in which the lower field is of oval, elliptical, or flattened oval or elliptical or like shape, that is to say, the length of which is greater in the transverse direction than in the vertical direction so that a wider field is provided for the lower focus without the latter approaching unduly toward the center of the lens.

My improved machine comprises a rotating tool which may be of any suitable construction, and a lens-holder, the said holder being mounted so that it can tilt in any direction upon the table which is adapted to reciprocate, or is mounted upon a second table in which it is reciprocated, the said second table being itself designed to be reciprocated upon a rigid platform or the like in a direction at right angles to that in which the first table reciprocates, so that an elliptical or like path is given to the lens-holder. The lens-holder has fitted to its underside what I term a former which is of a plano-convex or plano-concave shape and is supported upon a similarly dimensioned plano-concave or plano-convex former secured upon the rigid platform, the two formers lying one upon, or within, the other and the contacting surfaces being preferably smeared with oil so as to insure a good suction contact and a frictionless motion of the surfaces one over the other. The two tables are actuated by eccentrics, cranks or the like from an upright driving spindle which causes the said two tables to reciprocate in paths at right-angles to one another, so that the lens-holder, which, as above stated, is movably mounted on the inner table, is caused to execute an elliptical or like path, the dimensions and contour of which depend upon the eccentric or other driving gear. Where one table only is employed, then obviously the lens is merely reciprocated to and fro in one direction only.

The grinding tool is mounted above the lens holder and is brought to bear on the top of the glass to be ground, the said tool being rotated and the lens-holder reciprocated at the same time. As the holder reciprocates the lens being ground follows the contour of the formers, and since the tool rotates on a rigid upright axis, the glass is gradually ground until it eventually reproduces the shape of the contacting surface of the two formers. It will be obvious that in practice allowance is made to correct the error which would otherwise arise owing to the distance between the surface of the formers and the glass being ground.

In an alternative form of machine the lens to be operated upon is firmly fixed upon a rigid table or platform, the grinding tool being caused to move in the desired oval path upon the machine. The concavity is obtained from the grinding tool which is mounted through the medium of a ball and socket or universal attachment upon an upright standard, the said tool being guided, so as to conform to the movement of the table by an attachment carried by the latter. The ball and socket fitting constituting the pivot or former around which the tool spindle oscillates, can be adjusted in the vertical position upon the standard so as to regulate, as desired, the radius of curvature obtained thereby on the lens.

To enable the invention to be fully understood, I will describe it by reference to the accompanying drawings, in which:—

Figure 2:
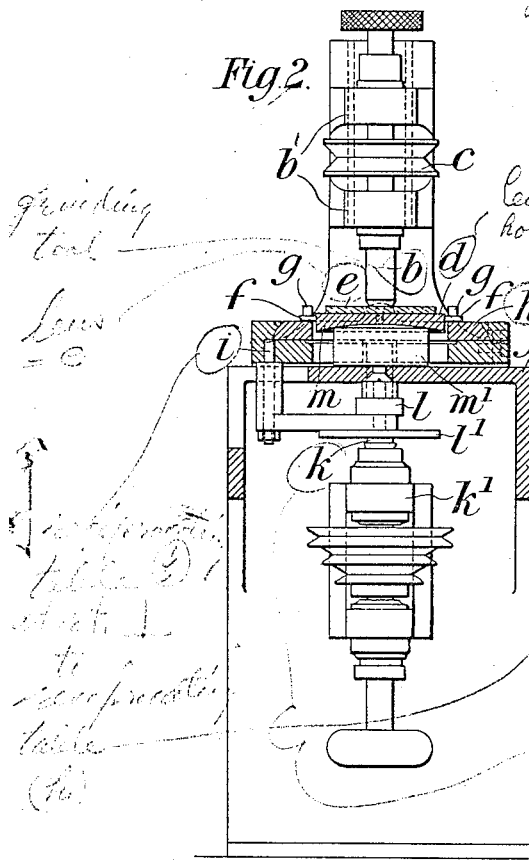
Figure 3:
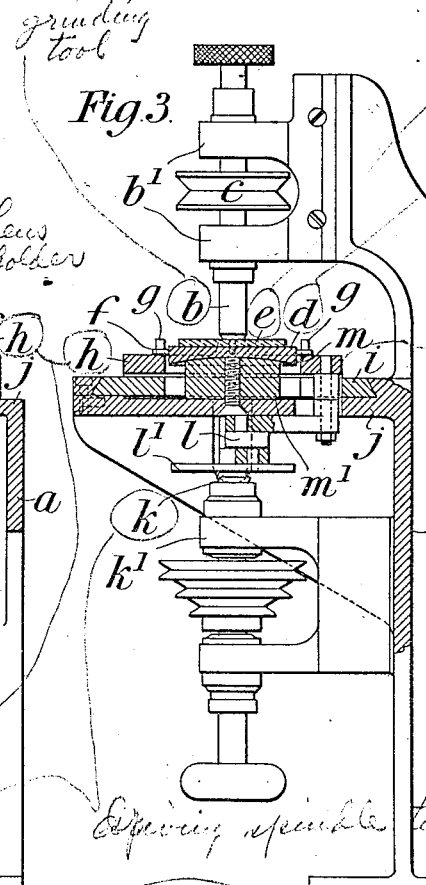
Figure 5:
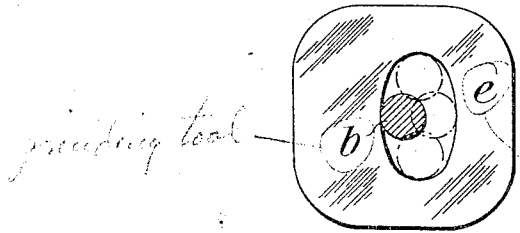
Figure 4:
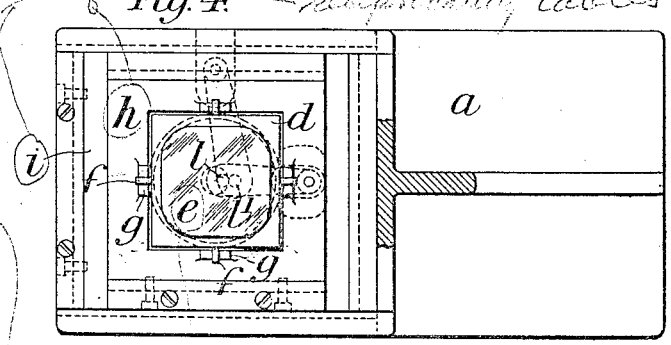

Figure 1 is a view of one form of bi-focal lens ground according to the invention. Figs. 2 and 3 are a sectional front view and a sectional side view of a machine for grinding a lens as shown in Fig. 1. Fig. 4 is a sectional plan view of the machine. Fig. 5 is a view illustrating the method of operation thereof. Fig. 6 is a sectional front view illustrating a modified form of machine. Fig. 7 is a sectional side view thereof, and Fig. 8 a sectional plan of the machine, shown in Fig. 6. Fig. 9 is a front view partly in section, illustrating a further form of the machine. Fig. 10 is a sectional side view thereof. Fig. 11 is a sectional plan view.

Referring first to the construction of machine illustrated in Figs. 2 to 5, $a$ represents the frame of the machine and $b$ is the rotating grinding tool which is mounted in the bearings $b^1$ secured to the upper part of the frame $a$ and is adapted to be driven by the pulley $c$ in the known manner. This grinding tool is preferably of mild steel which is turned to the desired curve and case-hardened or it may be of brass or gun-metal sheathed with steel and case-hardened.

$d$ is the lens-holder to the upper face of which the lens $e$ to be ground is cemented in the usual way, the said lens-holder being rectangular in shape and being provided with a pin $f$ projecting from each side which pins engage in notched lugs $g$ upon the table $h$ which is designed to be reciprocated upon the table $i$ itself arranged to reciprocate on the rigid platform $j$ projecting from the machine frame $a$, the said table $i$ reciprocating in a direction at right angles to that in which the table $h$ moves.

$k$ is the upright driving spindle which is mounted in the bearing $k^1$ secured to the frame $a$ below the platform $j$, and $l$, $l^1$ are the two cranks upon the driving shaft $k$ which respectively serve to reciprocate the lens-holder or table $h$ and the table $i$.

$m$ is the former which in the arrangement illustrated forms part of the lens-holder $d$ and which is of a plano-concave shape and $m^1$ is the plano-convex former secured upon the rigid platform $j$, the former $m$ resting upon the former $m^1$, and the contacting surfaces being smeared with oil as above described so as to insure a good suction contact and a frictionless motion of the surfaces one over the other.

The apparatus operates as follows, that is to say, assuming that the lens $e$ is cemented to the upper face of the lens-holder $d$ in the usual way and the grinding tool $b$ be brought so that it bears on the top of the said lens, the said tool is then rotated and the driving spindle $k$ also rotated so that the tables $h$ and $i$ reciprocate upon the fixed platform $j$, that is to say, relatively to the tool $b$ which rotates on a rigid upright axis. As the two tables reciprocate in the manner stated the lens $e$ being ground is caused to follow the contour of the two formers $m$, $m^1$ and as the tool rotates on a rigid upright axis the lens is gradually ground until finally there is reproduced upon it the shape of the contacting surfaces of the said two formers. As above described allowance in practice is made in order to correct the error which would otherwise occur arising from the distance between the surface of the former and that of the lens being ground.

In Figs. 6, 7 and 8, which represent a multiple machine that is to say, a machine in which two (or more) lenses can be simultaneously ground, the lens-holder $d$ is formed on its underside as before with the former surface $m$ which contacts with the former $m^1$, the two former surfaces being held in contact by means of the fork $n$ the two legs of which bear upon pins $n^1$ projecting from the side of the lens-holder $d$. This fork has a stem $o$ which is pivotally mounted in the sleeve $o^1$ also pivotally mounted at right angles to its own axis in the bracket $o^2$ fixed to the table $p$ so as to form a universal joint, a spring $o^3$ being provided for normally causing the fork to be pressed downward so as to hold the two former surfaces in contact. The table $p$ is reciprocated so as to execute the elliptical or other motion desired through the medium of the two cams $p^1$ and $p^2$ which are mounted upon the upright spindle $p^3$ and respectively engage the superposed slots $p^0$ and $p^4$ provided in the said table. The combined motions given by the two cams as the spindle rotates result in the particular elliptical or like curve desired. The other end of the table $p$ is provided with a slot $p^5$ with which engages a cam $p^6$ corresponding to the cam $p^2$ and mounted upon an upright spindle $p^7$, both the spindles $p^3$ and $p^7$ being driven by bevel gearing $q$ from a driving shaft $q^1$ mounted beneath the platform $j$ of the machine. The tool $b$ in this case is rigidly mounted as described with reference to the machine illustrated in Figs. 1 to 4 and the operation of the machine is similar to that above described.

Figs. 9, 10 and 11 illustrate a modified machine in which the radial motion necessary for obtaining the curvature of the lens and the elliptical shape of the latter is obtained by imparting a swinging movement to the grinding tool. This is effected as follows:—The lens $e$ to be ground is cemented in the usual way to the lens-holder $d$ which is fixed upon the platform $j$ of the machine frame $a$. The grinding tool $b$ is suspended from a universal joint, comprising a ball or sphere $r$ through a pulley on which the said tool can freely slide and which is movably held in a bearing $s$ adjustably mounted upon a standard $s^1$ erected on the machine frame $a$. The ball $r$ is movable in any direction in its spherical bearing $s$ so that the spindle $b$ has a free movement from this point of suspension, the said spindle being rotated by means of a pulley $t$ which rotates upon a sleeve $r^1$ extending from the ball or sphere $r$ and has a pin $t^1$ designed to engage with a pin $t^2$ projecting from the cutting tool $b$ so that as the said pulley $t$ rotates the pin $t^1$ makes contact with pin $t^2$ and correspondingly rotates the cutting tool. The lower end of the cutting tool passes through a second swivel joint comprising the ball $u$ mounted in the forked spherical bearing $u^1$ which is adjustably carried by an upright $u^2$ upon the carriage $p$. The carriage $p$ is given elliptical motion upon the platform $j$ by mechanism similar to the means which operate the carriage $p$ shown in Figs. 6, 7 and 8. With this construction of machine it will be obvious that as the carriage $p$ is reciprocated and the cutting tool $b$ at the same time rotated, the said tool is caused to oscillate about its pivot $r$ and at the same time is given the elliptical motion desired so that the concave elliptical surface is ground upon the lens.

Fig. 1 shows one form of lens produced according to my invention. It will be obvious, however, that the shape of the lower field may be varied in a number of ways and in fact it may be of any curved shape other than circular or semi-circular, which are the only shapes which can be produced by machines at present in vogue. Furthermore, lenses made according to my invention possess several advantages in practice. In the first place, the position of the optical center of the lower or more positive field can be absolutely controlled, secondly, the field of vision of the lower or more positive field is extended, and the upper field of which, in ordinary working, the optical center is under control, is at the same time of larger field relatively to that of the positive field than has hitherto been possible. Also the more positive field can be inserted between two portions of the more negative field, thus rendering the lens particularly convenient to the wearer when descending stairs, for example.

I claim—

1. A machine for grinding bi-focal lenses comprising means for holding the lens, a rotatable grinding tool for grinding the same, and means for imparting to one of said parts rocking and elliptical movement, whereby an elliptical concavity is formed in the lens.

2. A machine for grinding bi-focal lenses comprising a lens holder, a rotatable grinding tool, and means for imparting to said grinding tool, rocking and elliptical movement, whereby an elliptical concavity is formed in the lens.

3. A machine for grinding bi-focal lenses comprising a stationary lens holder, a rotatable grinding tool suspended by a universal joint so that it can oscillate around the same, and means for imparting substantially elliptical motion to said tool.

4. A machine for grinding bi-focal lenses comprising a lens holder, a rotatable grinding tool, a universal joint in which the upper end of the grinding tool is rotatably mounted, and means provided near the lower end of said grinding tool for moving the lower end of said tool substantially elliptically.

5. A machine for grinding lenses comprising a frame, a universal joint adjustable vertically on said frame, a grinding tool rotatably mounted in said universal joint, a lens holder, and means for moving said grinding tool substantially elliptically upon said lens holder.

6. A machine for grinding bi-focal lenses comprising a grinding tool, a universal fitting in which the upper end of said grinding tool is rotatably mounted, a universal fitting in which the lower end of said grinding tool is rotatably mounted, a lens holder, and means for moving the lower universal fitting substantially elliptically.

7. A machine for grinding lenses comprising an upper universal fitting, a grinding tool having its upper end rotatably mounted in said fitting, a lower universal fitting in which the lower end of said grinding tool is rotatably mounted, adjustable carrying means for said lower universal fitting, and means for moving said adjustable carrying means substantially elliptically.

8. A machine for grinding lenses comprising an upper universal fitting, a grinding tool having its upper end rotatably mounted in said fitting, a lower universal fitting in which the lower end of said grinding tool is rotatably mounted, carrying means for said lower universal fitting, a carriage upon which the carrying means is rigidly mounted, said carriage being provided with an upper and lower slot at right angles to one another, and a plurality of eccentrically mounted rotating disks adapted to travel in said slots to move said carriage in a substantially elliptical path.

HARRY NEWBOLD.

Witnesses:
JOHN E. BOUSFIELD,
C. G. REDFEN.